United States Patent
Luo

(10) Patent No.: US 11,158,447 B2
(45) Date of Patent: Oct. 26, 2021

(54) FUNCTIONAL COMPONENT, METHOD FOR CONTROLLING FUNCTIONAL COMPONENT, AND TERMINAL

(71) Applicant: Beijing Xiaomi Mobile Software Co., Ltd., Beijing (CN)

(72) Inventor: Tianbiao Luo, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 299 days.

(21) Appl. No.: 16/234,100

(22) Filed: Dec. 27, 2018

(65) Prior Publication Data
US 2020/0020471 A1 Jan. 16, 2020

(30) Foreign Application Priority Data
Jul. 10, 2018 (CN) .......................... 201810751542.0

(51) Int. Cl.
*H01F 7/00* (2006.01)
*H01F 7/08* (2006.01)
(Continued)

(52) U.S. Cl.
CPC .............. *H01F 7/081* (2013.01); *H01F 7/02* (2013.01); *H01F 7/064* (2013.01); *H01F 7/121* (2013.01); *H01F 7/16* (2013.01)

(58) Field of Classification Search
CPC . H01F 7/081; H01F 7/02; H01F 7/064; H01F 7/121; H01F 7/16
(Continued)

(56) References Cited

U.S. PATENT DOCUMENTS

2011/0073118 A1* 3/2011 Ponsort .................... H01F 7/04
128/845
2014/0354100 A1* 12/2014 Furuta ................ H01F 41/0253
310/156.01
(Continued)

FOREIGN PATENT DOCUMENTS

CN 101801484 A 8/2010
CN 104683514 A 6/2015
(Continued)

OTHER PUBLICATIONS

Combined Chinese Office Action and Search Report dated Nov. 19, 2019 in Chinese Patent Application No. 201810751542.0 (with English translation), 12 pages.
(Continued)

*Primary Examiner* — Shawki S Ismail
*Assistant Examiner* — Lisa N Homza
(74) *Attorney, Agent, or Firm* — Oblon, McClelland, Maier & Neustadt, L.L.P.

(57) ABSTRACT

Aspects of the disclosure provide apparatuses, methods for controlling the apparatuses, and terminal devices containing the apparatuses in the field of mobile solutions. In an example, an apparatus includes a magnetic moving structure and a functional module. The magnetic moving structure has a fixed part, a moving part configured to be movable along a specified trajectory of the fixed part, and a magnetic part. The functional module is connected with the moving part and is configured to move with the moving part. The magnetic part includes a first magnet located on the fixed part and a second magnet located on the moving part and the magnetic part is configured to generate a magnetic force to move the moving part along the specified trajectory.

14 Claims, 9 Drawing Sheets

(51) Int. Cl.
*H01F 7/02* (2006.01)
*H01F 7/06* (2006.01)
*H01F 7/121* (2006.01)
*H01F 7/16* (2006.01)

(58) Field of Classification Search
USPC .......................................................... 335/219
See application file for complete search history.

(56) References Cited

U.S. PATENT DOCUMENTS

| | | | | |
|---|---|---|---|---|
| 2014/0354381 | A1* | 12/2014 | Kohlhafer | H01F 7/081 335/179 |
| 2015/0248959 | A1* | 9/2015 | Hamelinck | H02N 15/00 335/229 |
| 2015/0282692 | A1* | 10/2015 | Wieters | H02K 41/031 604/95.05 |
| 2015/0371748 | A1* | 12/2015 | Kim | H01H 47/22 361/190 |
| 2016/0071640 | A1* | 3/2016 | Kato | H01F 7/1646 335/229 |
| 2016/0172091 | A1* | 6/2016 | Ott | F16K 31/0675 335/229 |
| 2016/0233012 | A1* | 8/2016 | Lubinski | H01F 41/02 |
| 2016/0265940 | A1* | 9/2016 | Burgdorf | H02K 11/215 |
| 2017/0074418 | A1* | 3/2017 | Liang | H01F 27/325 |
| 2017/0159843 | A1* | 6/2017 | Fujita | F16K 27/029 |
| 2017/0159844 | A1* | 6/2017 | Fujita | F16K 31/082 |
| 2019/0074148 | A1* | 3/2019 | Takasuka | H01F 7/064 |

FOREIGN PATENT DOCUMENTS

| | | |
|---|---|---|
| CN | 105245647 A | 1/2016 |
| CN | 105897288 A | 8/2016 |
| CN | 207150657 U | 3/2018 |
| CN | 207304636 U | 5/2018 |
| CN | 207354463 U | 5/2018 |

OTHER PUBLICATIONS

Extended European Search Report dated Oct. 23, 2019 in European Patent Application No. 19174454.9, 7 pages.

Notice of Allowance dated Sep. 22, 2020 in Chinese Patent Application No. 20180751542.0 (with English translation), 5 pages.

* cited by examiner

FUNCTIONAL COMPONENT, METHOD FOR CONTROLLING FUNCTIONAL COMPONENT, AND TERMINAL

CROSS-REFERENCE TO RELATED APPLICATIONS

This application claims priority to Chinese Patent Application No. 201810751542.0, entitled "FUNCTIONAL COMPONENT AND METHOD FOR CONTROLLING FUNCTIONAL COMPONENT AND TERMINAL" filed on Jul. 10, 2018. The entire disclosure of the prior application is hereby incorporated by reference in its entirety.

TECHNICAL FIELD

The present disclosure generally relates to the field of mobile solutions, for example, mobile devices, and more particularly to a functional component (an apparatus), a method for controlling functional component and a terminal (a terminal device).

BACKGROUND

At present, a terminal usually includes various functional modules (for example, an image acquisition module, a sound acquisition module and a fingerprint acquisition module and the like) and these functional modules are usually arranged at various positions of the terminal for facilitate a user to use them. However, with the development of terminals, functional modules are difficult to be arranged outside of terminals. Therefore, there is an urgent need for a part enabling a functional module to move between the inside and outside of a terminal.

In a related art, a functional component includes a moving mechanism and a functional module and the functional module is connected with the moving mechanism. The moving mechanism includes a PUSH-PUSH structure which may move the functional module under cooperation of a spring and a mechanical structure therein.

However, with the increase of service time, a spring force of the spring in the functional component may change and further, the functional module may be difficult to move normally.

SUMMARY

Aspects of the disclosure provide methods and apparatuses for controlling functional modules. For example, an apparatus includes a magnetic moving structure and a functional module. The magnetic moving structure has a fixed part, a moving part configured to be movable along a specified trajectory of the fixed part, and a magnetic part. The functional module is connected with the moving part and is configured to move with the moving part. The magnetic part includes a first magnet located on the fixed part and a second magnet located on the moving part and the magnetic part is configured to generate a magnetic force to move the moving part along the specified trajectory.

In one embodiment, one of the first magnet and the second magnet is a permanent magnet and the other of the first magnet and the second magnet is an electromagnet.

In one embodiment, the first magnet is located on the fixed part at an accommodation point of the specified trajectory, and the magnetic part includes a third magnet that is located at an ejection point of the specified trajectory of the fixed part. One of the first magnet and the third magnet is a permanent magnet and the other of the first magnet and the third magnet is an electromagnet.

In one embodiment, the fixed part includes a sliding guide rail corresponding to the specified trajectory, and the moving part is movable along the sliding guide rail. The sliding guide rail includes a pair of parallel sub-guide-rails, and the third magnet includes a pair of sub-magnets that are respectively located on the pair of parallel sub-guide-rails.

In one embodiment, a first connecting line of two magnetic poles of the first magnet is parallel to a second connection line of two magnetic poles of the second magnet. A third connection line of two magnetic poles of the third magnet is parallel to the second connection line.

In one embodiment, the functional module includes a sound acquisition module, and the moving part includes a magnetism isolation piece configured to provide a magnetic isolation to the sound acquisition module from the magnetic part.

In one embodiment, the functional module includes at least one of a fingerprint recognition module, a structured light face recognition module, a distance sensor, and a luminance sensor.

According to one aspect of the disclosure, there is provided a method for controlling an apparatus with a magnet moving structure and a functional module. For example, the method includes determining a first current direction for driving a first magnet that is installed on a fixed part of the magnet moving structure, the magnetic moving structure including a moving part that is movable along a specified trajectory of the fixed part of the magnetic moving structure, and the function module is attached to the moving part. The method includes providing the first magnet with a first current having the first current direction to generate a first magnetic force between the first magnet and a second magnet that is installed on the moving part, the first magnetic force causes the moving part to move the functional module along the specified trajectory.

In one embodiment, the method further includes providing the first magnet with a second current having a second current direction, which is opposite to the first current direction, to generate a second magnetic force between the first magnet and the second magnet, the second magnetic force causes the moving part to move the functional module in another direction along the specified trajectory.

In one embodiment, the first magnet is an electromagnet, and the second magnet is one of an electromagnet and a permanent magnet.

In one embodiment, the first magnetic force causes the moving part to move the functional module from an accommodation point of the specified trajectory to an ejection point of the specified trajectory, the first magnetic force is a magnetic repulsive force between the first magnet and the second magnet.

In one embodiment, the method further includes settling the moving part at an ejection point of the specified trajectory through a magnetic attractive force between the second magnet and a third magnet, which is installed on the fixed part of the magnet moving structure of the apparatus, when the moving part moves the functional module from an accommodation point of the specified trajectory to the ejection point of the specified trajectory. The method further includes providing the first magnet with a second current having a second current direction, which is opposite to the first current direction, to generate a second magnetic force between the first magnet and the second magnet, the second magnetic force is a magnet attractive force between the first magnet and the second magnet, and causes the moving part to move the functional module from the ejection point of the specified trajectory to the accommodation point of the specified trajectory. The method further includes settling the moving part at the accommodation point of the specified trajectory through a magnetic repulsive force between the second magnet and the third magnet, when the moving part moves the functional module from the ejection point of the specified trajectory to the accommodation point of the specified trajectory.

In one embodiment, the first magnet is an electromagnet, one of the second magnet and the third magnet is a permanent magnet and the other of the second magnet and the third magnet is an electromagnet.

In one embodiment, the specified trajectory corresponds to a sliding guide rail with a pair of parallel sub-guide-rails, which are installed on the fixed part of the magnet moving structure of the apparatus.

According to one aspect of the disclosure, there is provided a terminal device. For example, the terminal device includes a magnetic moving structure including a fixed part, a moving part configured to be movable along a specified trajectory of the fixed part, and a magnetic part having a first magnet located on the fixed part and a second magnet located on the moving part. The terminal device includes a functional module that is connected with the moving part and is configured to move with the moving part. The terminal device includes a control circuitry configured to provide current to the magnetic part to generate a magnetic force to cause the moving part to move the functional module along the specified trajectory.

It is to be understood that both the foregoing general description and the following detailed description are exemplary and explanatory, and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

At present, various functional components enabling functional modules to move between the inside and outside of a terminal are provided by each manufacturer. For example, for a functional component adopting a PUSH-PUSH structure, since the PUSH-PUSH structure includes more mechanical structures, the PUSH-PUSH structure is easy to be abraded seriously upon being used for a long time, which may further make the functional module difficult to move normally. In addition, the functional module may also be difficult to move normally, due to such as aging and non-uniform spring force of a spring in the PUSH-PUSH structure upon being used for a long time.

The embodiments of the present disclosure provide a functional component, a method for controlling functional component and a terminal, which may solve the problem in the related art.

The terminal involved in each embodiment of the present disclosure may include a mobile phone, a tablet computer, a wearable intelligent device, a notebook computer, a digital camera, a digital video camera, a tape recorder and the like.

Figure 1:
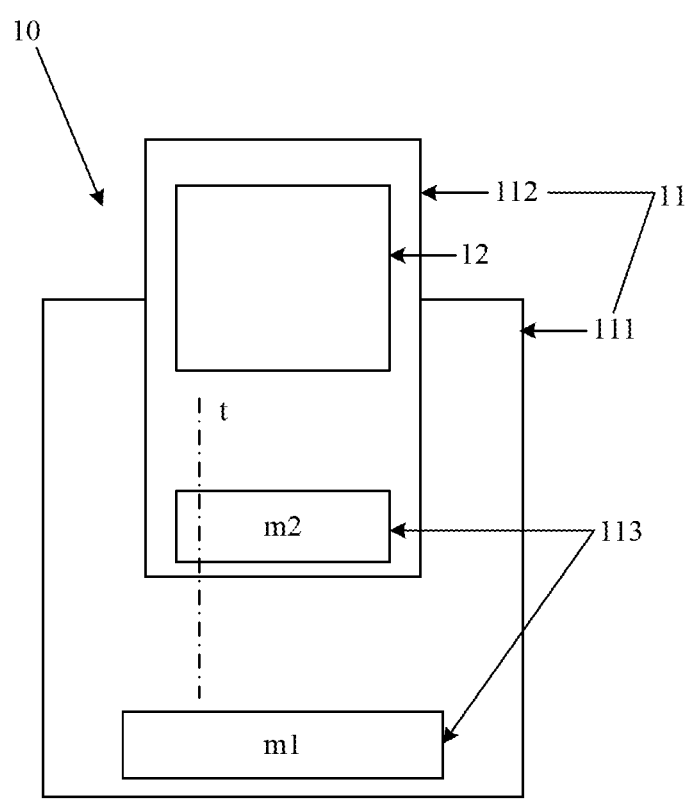
FIG. 1 is a schematic structural diagram of a functional component according to an embodiment of the present disclosure.

FIG. 1 is a schematic structural diagram of a functional component according to an embodiment of the present disclosure. The functional component 10 may include:

a magnetic moving structure 11 and a functional module 12.

The magnetic moving structure 11 includes a fixed part 111, a moving part 112 and a magnetic part 113. The moving part 112 is arranged to move on the fixed part 111 along a specified trajectory t. The moving part 112 is connected with the functional module 12.

The magnetic part 113 includes a first magnet m1 arranged on the fixed part 111 and a second magnet m2 arranged on the moving part 112. One of the first magnet m1 and the second magnet m2 is an electromagnet and the other is a magnet.

The magnet may include a permanent magnet and an electromagnet. The electromagnet usually includes a magnetic core and a coil wound around the magnetic core. When the coil is energized, the electromagnet may generate magnetism, and according to different current directions, directions of magnetic poles of the electromagnet may also be different. When the coil is de-energized, the magnetism of the electromagnet may disappear.

From the above description, according to the functional component provided by the embodiment of the present disclosure, the moving part fixed with the functional module moves on the fixed part along the specified trajectory through the magnetic part including the electromagnet and the magnet, and the moving part may further drive the functional module to move. The problem in the related art that the functional module may be difficult to move normally upon being used for a long time is solved. The effect that the functional module may move normally upon being used for a long time is achieved.

Figure 2:
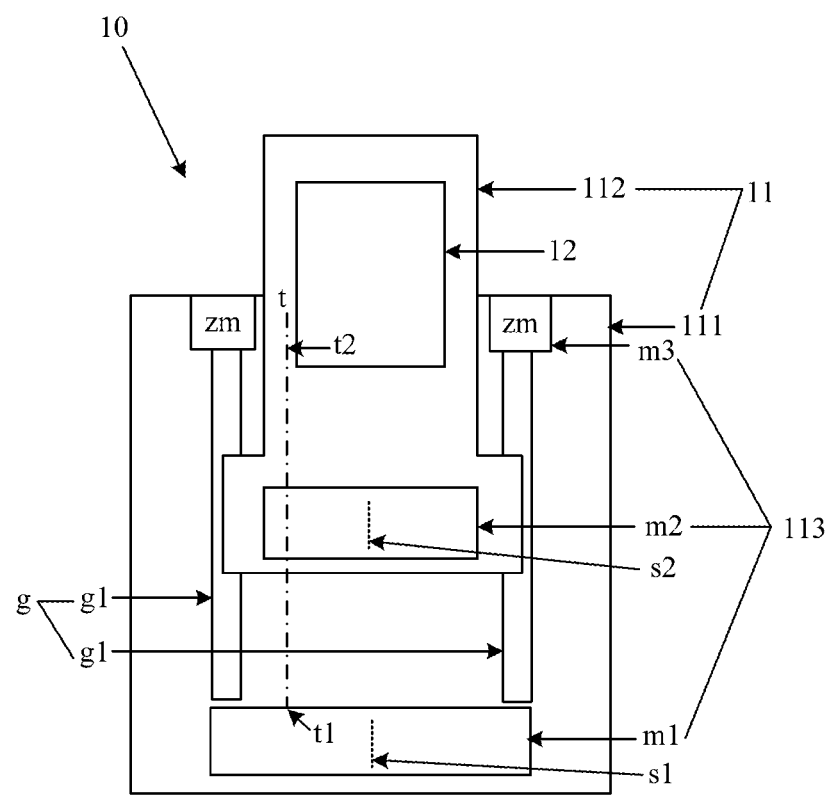
FIG. 2 is a schematic structural diagram of another functional component according to an embodiment of the present disclosure.

Alternatively, FIG. 2 is a schematic structural diagram of another functional component according to an embodiment of the present disclosure. The functional component is modified to a certain extent on the basis of the functional component shown in FIG. 1.

Alternatively, the first magnet m1 may be a permanent magnet and the permanent magnet is a magnet which may be kept magnetism for a long time. The first magnet m1 may be formed by a natural magnet or an artificial permanent magnet (for example, an aluminum-nickel-cobalt alloy). The second magnet m2 is an electromagnet. In such a structure, the second magnet m2 may be energized to enable the second magnet m2 to generate magnetism and enable the second magnet m2 to drive the moving part 112 to move through a magnetic attraction force or magnetic repulsive force generated between the magnetism and magnetism of the first magnet m1.

In the embodiment of the present disclosure, the first magnet m1 may also be an electromagnet and the second magnet m2 is a permanent magnet. In such a structure, the first magnet m1 may be energized to enable the first magnet m1 to generate magnetism and enable the second magnet m2 to drive the moving part 112 to move through the magnetic attraction force or magnetic repulsive force generated between the magnetism and the magnetism of the second magnet m2.

Alternatively, the magnetic part 113 further includes a third magnet m3, and the specified trajectory t includes an accommodation point and an ejection point.

The first magnet m1 is located at an accommodation position t1 where the accommodation point is located and the third magnet m3 is located at an ejection position t2 where the ejection point is located. The third magnet m3 may be arranged to attract the second magnet m2 at the ejection position t2 through a magnetic attraction force with the second magnet m2 to fix the moving part 112 connected with the second magnet m2. Or, the third magnet m3 may be arranged to enable the second magnet m2 to drive the moving part 112 to move to the accommodation position t1 at the ejection position t2 through a magnetic repulsive force with the second magnet m2.

When the second magnet m2 is located at the accommodation position t1, the functional module 12 arranged on the moving part 112 may also be located at a position corresponding to the accommodation position t1. Correspondingly, when the second magnet m2 is located at the ejection position t2, the functional module 12 arranged on the moving part 112 may also be located at a position corresponding to the ejection position t2.

Alternatively, the third magnet m3 is a permanent magnet, and in such case, the second magnet m2 which is energized may be attracted through the magnetic attraction force generated by the magnetism and magnetism of the third magnet m3 to be fixed at the ejection position t2. Or, the third magnet m3 may also be an electromagnet, and in such case, the third magnet m3 may be energized to realize various functions of the third magnet m3.

Alternatively, the fixed part 111 is provided with a sliding guide rail g thereon. Both of the accommodation position t1 and the ejection position t2 are located on the sliding guide rail g. The moving part 112 is connected with the sliding guide rail g in a sliding manner.

Alternatively, the sliding guide rail g includes two sub guide rails g1 which are parallel to each other. The third magnet m3 includes two sub-magnets zm. The two sub-magnets zm are arranged on the two sub guide rails g1 respectively.

Alternatively, a connecting line s1 of two magnetic poles of the first magnet m1 is parallel to a connecting line s2 of two magnetic poles of the second magnet m2. The connecting line s1 indicates a virtual line connecting centers of the two magnetic poles of the first magnet m1. The connecting line s2 indicates a virtual line connecting centers of the two magnetic poles of the second magnet m2.

Alternatively, a connecting line (not shown in FIG. 2) of two magnetic poles of the third magnet m3 is parallel to the connecting line s2 of the two magnetic poles of the second magnet m2.

Figure 3:
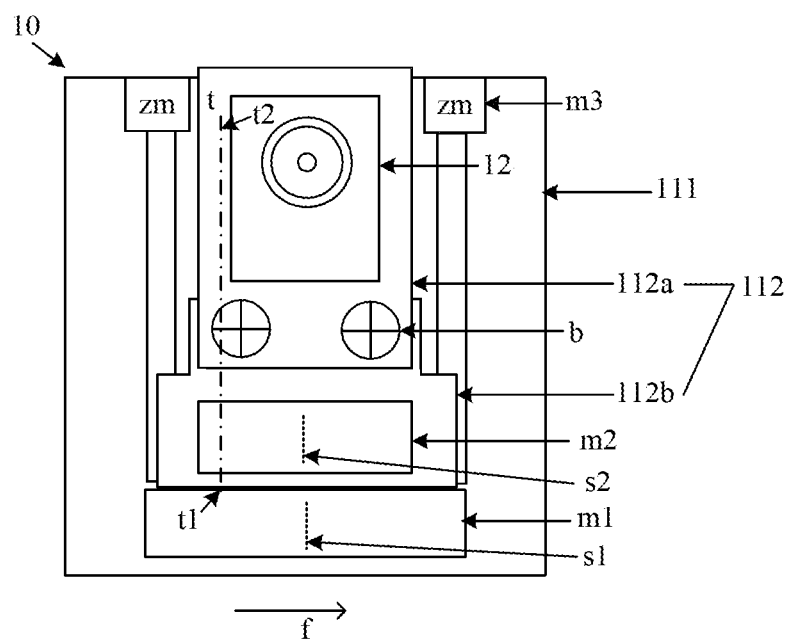
FIG. 3 is a schematic structural diagram of another functional component according to an embodiment of the present disclosure.

Alternatively, FIG. 3 is a schematic structural diagram of another functional component according to an embodiment of the present disclosure. The first magnet m1 is bar-shaped. A connecting line between the accommodation position t1 and the ejection position t2 is perpendicular to a length direction f of the first magnet m1. In the structure shown in FIG. 3, the wider magnetic pole of the first magnet m1 faces the second magnet t2, so that the magnetic attraction force or magnetic repulsive force between the first magnet m1 and the second magnet m2 may be stronger. The length direction f of the first magnet m1 is perpendicular to the moving trajectory of the moving part 112, so that the magnetic repulsive force or magnetic attraction force between the first magnet m1 and the second magnet m2 on the moving part 112 may be more stable, and the moving part 112 may move more stably.

Alternatively, as shown in FIG. 3, the moving part 112 may include a first moving part 112a provided with the functional module 12 and a second moving part 112b provided with the second magnet m2. The first moving part 112a and the second moving part 112b may be fixedly connected through a bolt b.

Alternatively, the functional module 12 includes an image acquisition module. The image acquisition module may be a camera.

Alternatively, the functional module 12 includes a sound acquisition module. The sound acquisition module may include a Microphone (MIC).

When the functional module 12 includes the sound acquisition module, in order to avoid interference of a magnetic force of the magnetic part to the sound acquisition module, the moving part 112 may include a magnetism isolation piece (not shown in FIG. 3) arranged to isolate a magnetic force of the magnetic part from the sound acquisition module. The magnetism isolation piece may be made from a permeability magnetic material.

Alternatively, the functional module 12 includes at least one of a fingerprint recognition module, a structured light face recognition module, a distance sensor and a luminance sensor. For example, the fingerprint recognition module may be a pressing-type fingerprint sensor, a scraping-type fingerprint sensor, etc. and the structured light face recognition module may be a grating-type structured light sensor, a 3D camera with a structured light solution, etc.

Figure 4:
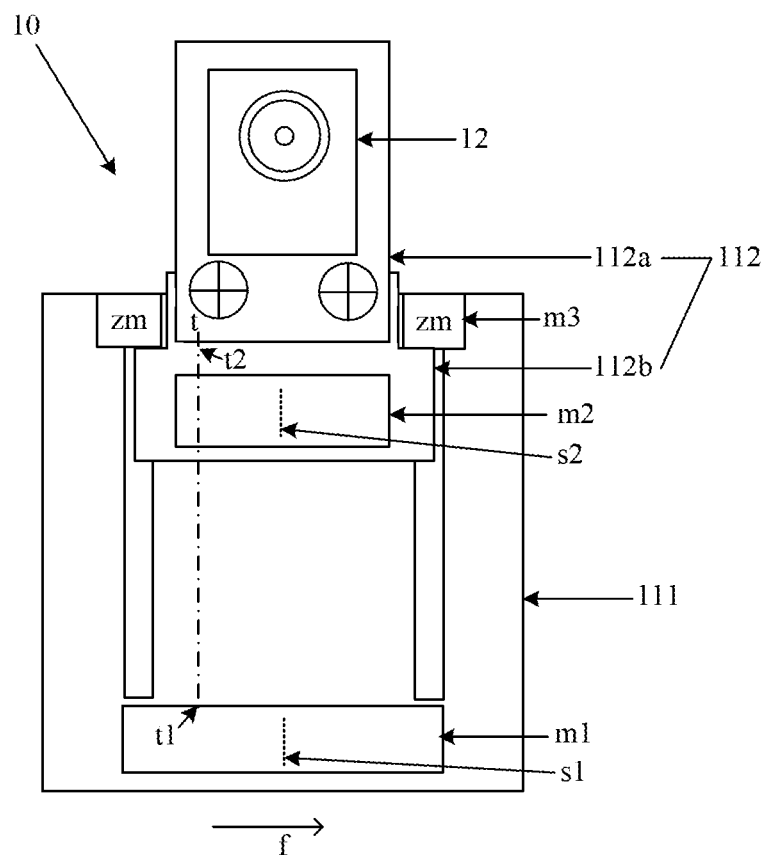
FIG. 4 is a schematic structural diagram when a moving part of the functional component shown in FIG. 3 is located at an ejection position.

FIG. 3 is a schematic structural diagram when the moving part 112 is located at the accommodation position t1. The moving part 112 and the fixed part 111 are overlapped together, so that an overall size of the functional component is relatively small and it can be conveniently arranged in a terminal. The structure when the moving part 112 is located at the ejection position t2 is shown in FIG. 4. The functional module 12 is driven by the moving part 112 to extend out of the fixed part 111 so as to extend out of the terminal.

From the above description, according to the functional component provided by the embodiment of the present disclosure, the moving part fixed with the functional module moves on the fixed part along the specified trajectory through the magnetic part including the electromagnet and the magnet, and the moving part may further drive the functional module to move. The problem in the related art that the functional module may be difficult to move normally upon being used for a long time is solved. The effect that the functional module may move normally upon being used for a long time is achieved.

Figure 5:
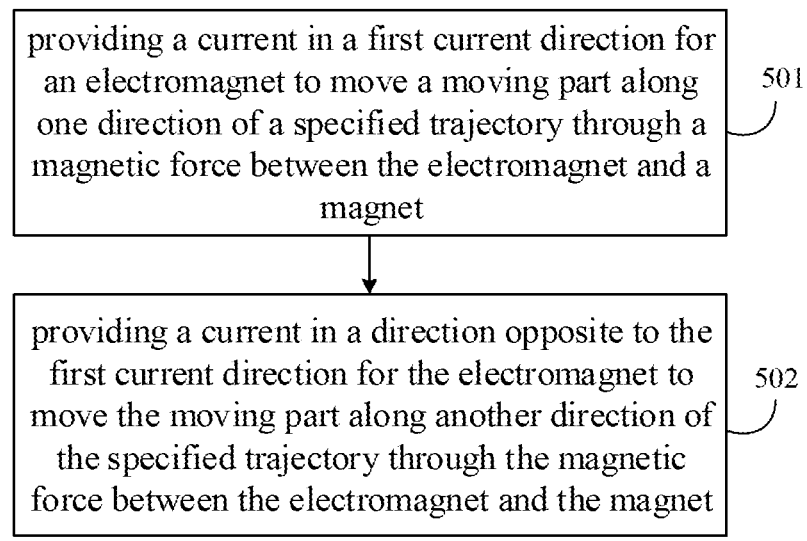
FIG. 5 is a flow chart showing a method for controlling functional component according to an embodiment of the present disclosure.

FIG. 5 is a flow chart showing a method for controlling functional component according to an embodiment of the present disclosure. The method may be applied to any one of functional components provided by the abovementioned embodiments. The method may include the following steps.

In Step 501, a current in a first current direction is provided for an electromagnet to move a moving part along one direction of a specified trajectory through a magnetic force between the electromagnet and a magnet.

In Step 502, a current in a direction opposite to the first current direction is provided for the electromagnet to move the moving part along the other direction of the specified trajectory through the magnetic force between the electromagnet and the magnet.

From the above description, according to the method for controlling functional component provided by the embodiment of the present disclosure, the moving part fixed with a functional module moves on a fixed part along the specified trajectory through a magnetic part including the electromagnet and the magnet, and the moving part may further drive the functional module to move. The problem in the related art that the functional module may be difficult to move normally upon being used for a long time is solved. The effect that the functional module may move normally upon being used for a long time is achieved.

Figure 6:
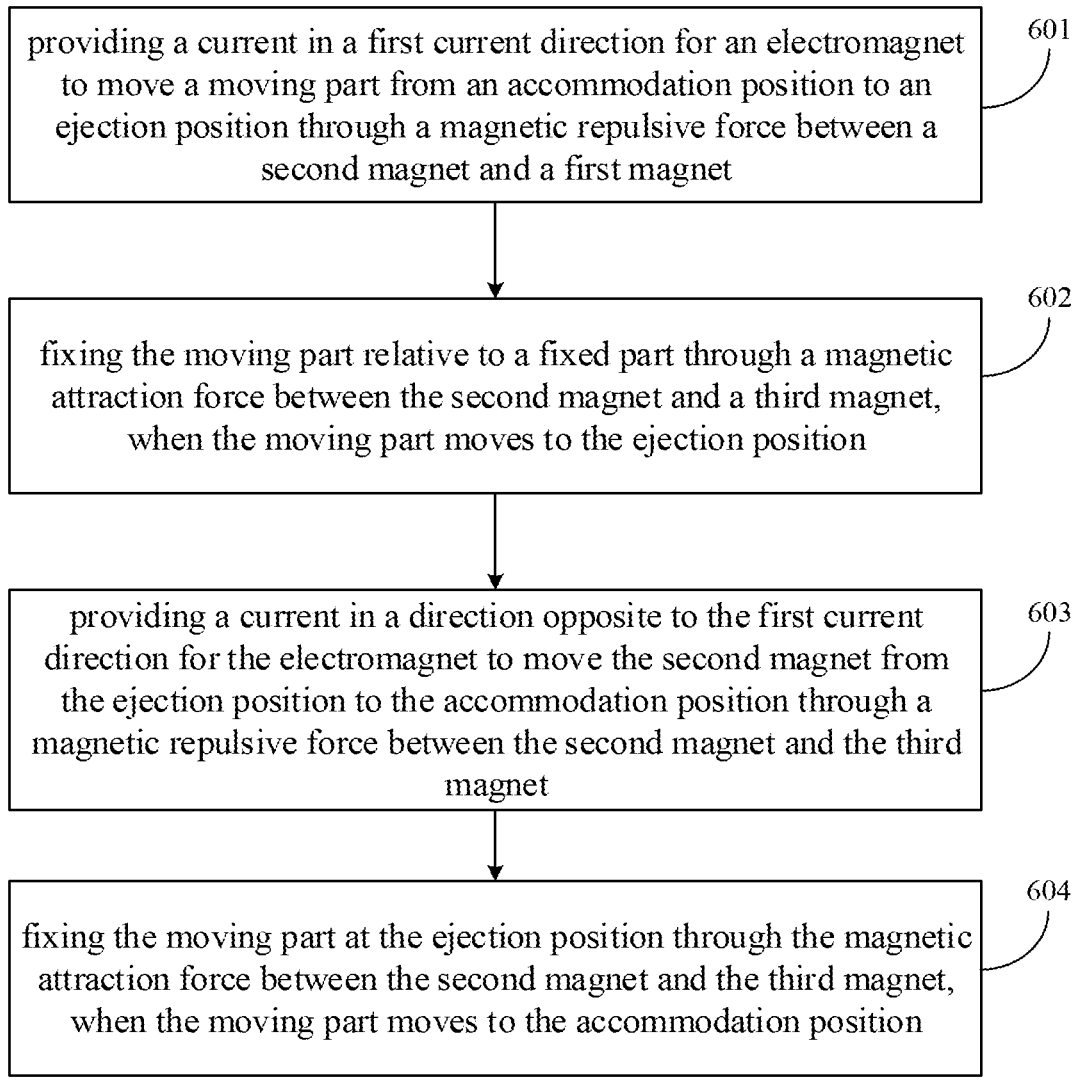
FIG. 6 is a flow chart showing another method for controlling functional component according to an embodiment of the present disclosure.

FIG. 6 illustrates a method for controlling functional component according to an embodiment of the present disclosure. The method may be used to control the functional component provided by the embodiment shown in FIG. 2. The method may include the following steps.

In Step 601, a current in a first current direction is provided for an electromagnet to move a moving part from an accommodation position to an ejection position through a magnetic repulsive force between a second magnet and a first magnet.

In the embodiment of the present disclosure, the functional component may be connected with an external control component (the control component may include a processor or other control circuits). The control component may provide electric energy for the functional component to further control the electromagnet in the functional component. In the method provided by the embodiment of the present disclosure, the control component may energize the second magnet in the first current direction at first to move the moving part from the accommodation position to the ejection position through the magnetic repulsive force between the second magnet and the first magnet.

The current direction may refer to a moving direction of positive charges in a coil in the electromagnet.

Alternatively, since a magnetic field is stronger when a current in the coil of the electromagnet is higher, a magnitude of the current introduced into the second magnet may be controlled to control a moving speed of the second magnet, and a moving speed of the functional module may further be controlled.

In Step 602, the moving part is fixed relative to a fixed part through a magnetic attraction force between the second magnet and a third magnet, when the moving part moves to the ejection position.

In a process that the moving part moves to the ejection position, when a magnetic pole of the second magnet being close to one side of the third magnet is different from a magnetic pole of the third magnet being close to one side of the second magnet (a difference of the magnetic poles may be implemented by changing the current direction in the coil) or one of the second magnet and the third magnet has a magnetic field and the other does not have magnetic field but has ferromagnetism, the magnetic attraction force may be generated between the third magnet and the second magnet, and through the magnetic attraction force, the second magnet may be attracted to the third magnet when a distance between the second magnet and the third magnet is shorter than a specified distance (the specified distance may be determined by a magnitude of the magnetic attraction force and resistance to movement of the moving part) and the second magnet may further be fixed at the ejection position when the second magnet reaches the ejection position. When the second magnet moves to the ejection position, the moving part may simultaneously be driven to move to the ejection position and the moving part may be fixed relative to the fixed part. The functional module arranged on the moving part may also move to a position corresponding to the ejection position.

Both of the second magnet and the third magnet may be electromagnets, or one of the second magnet and the third magnet may be an electromagnet and the other may be a permanent magnet. The energizing current direction of the electromagnet in the second magnet and the third magnet may be modified to generate the magnetic attraction force between the second magnet and the third magnet.

Step 601 and Step 602 are steps for moving the moving part from the accommodation position to the ejection position.

In Step 603, a current in a direction opposite to the first current direction is provided for the electromagnet to move the second magnet from the ejection position to the accommodation position through a magnetic repulsive force between the second magnet and the third magnet.

When the second magnet is intended to move from the ejection position to the accommodation position, the control component may energize the electromagnet in the direction opposite to the first current direction, then the magnetic repulsive force may be generated between the second magnet and the third magnet, and the second magnet may be driven by the magnetic repulsive force to move to the accommodation position.

In Step 604, the moving part is fixed at the ejection position through the magnetic attraction force between the second magnet and the third magnet, when the moving part moves to the accommodation position.

The step may refer to Step 602 and will not be elaborated herein.

Step 603 and Step 604 are steps for moving the moving part from the ejection position to the accommodation position. According to a position of the mobile terminal, Step 603 and Step 604 may also be executed before Step 601 and Step 602. There are no limits made in the embodiment of the present disclosure.

The method for controlling functional component provided by the embodiment of the present disclosure may be applied to the terminal and the processor in the terminal may be arranged to control the functional component.

From the above description, according to the method for controlling functional component provided by the embodiment of the present disclosure, the moving part fixed with the functional module moves on the fixed part along the specified trajectory through the magnetic part including the electromagnet and the magnet, and the moving part may further drive the functional module to move. The problem in the related art that the functional module may be difficult to move normally upon being used for a long time is solved. The effect that the functional module may move normally upon being used for a long time is achieved.

The embodiments of the present disclosure further provide a terminal, which may include at least one of functional components provided by the abovementioned embodiments. The terminal may be a mobile phone.

Alternatively, a fixed part in the functional component may be fixedly connected with a front shell (the front shell is a part arranged to protect a display screen, is arranged on a back surface of the display screen and is also called a middle plate) or rear cover (also called a battery cover) in the terminal. Alternatively, the fixed part may be integrated with the front shell or the rear cover.

Figure 7:
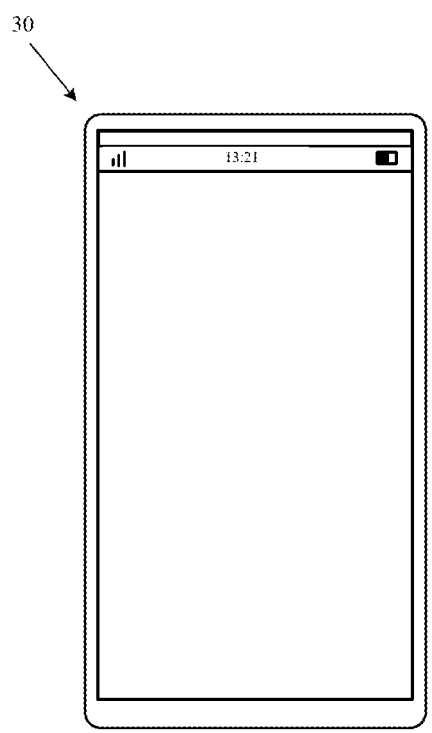
FIG. 7 is a schematic structural diagram of a terminal according to an embodiment of the present disclosure.

As shown in FIG. 7, when a second magnet in the functional component is located at an accommodation position, a moving part and a functional module on the moving part may be hidden inside the terminal 30. In such case, all of an image acquisition component, sound acquisition component, fingerprint recognition component, structured light face recognition component, distance sensor, luminance sensor and the like originally arranged on a front surface (i.e., the surface where a display surface of the display screen is located) of the terminal may be hidden inside the terminal 30 and an area occupied by the display surface of the display screen on the front surface of the terminal 30 is prevented from being occupied, so that a screen-to-body ratio of the terminal may be increased. The structure of the functional component in FIG. 7 may refer to FIG. 3 and will not be elaborated herein.

Figure 8:
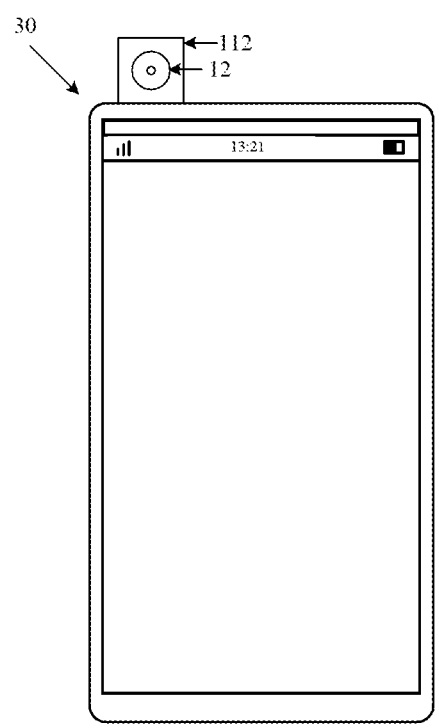
FIG. 8 is a schematic structural diagram when a functional module in the terminal shown in FIG. 7 extends out of the terminal.

FIG. 8 is a schematic structural diagram when the second magnet in the functional component in the terminal 30 shown in FIG. 7 is located at an ejection position. A part of the moving part 112 and the functional module 12 on the moving part 112 may extend out of the terminal 30 to facilitate various functional modules 12 to realize functions thereof. For example, the image acquisition module, after extending out of the terminal, may acquire an image outside the terminal. The structure of the functional component in FIG. 8 may refer to FIG. 4 and will not be elaborated herein. The terminal 30 may control the functional module to retract into the terminal 30 or extend out of the terminal 30 through a direction of a current introduced into an electromagnet in the functional component. The terminal 30 may also control a speed at which the functional module retracts into the terminal 30 or extends out of the terminal 30 through a magnitude of the current introduced into the electromagnet in the functional component.

Alternatively, a moving trajectory of the moving part 112 may be parallel to the front surface of the terminal 30, and thus a thickness of the terminal 30 may be reduced.

Figure 9:
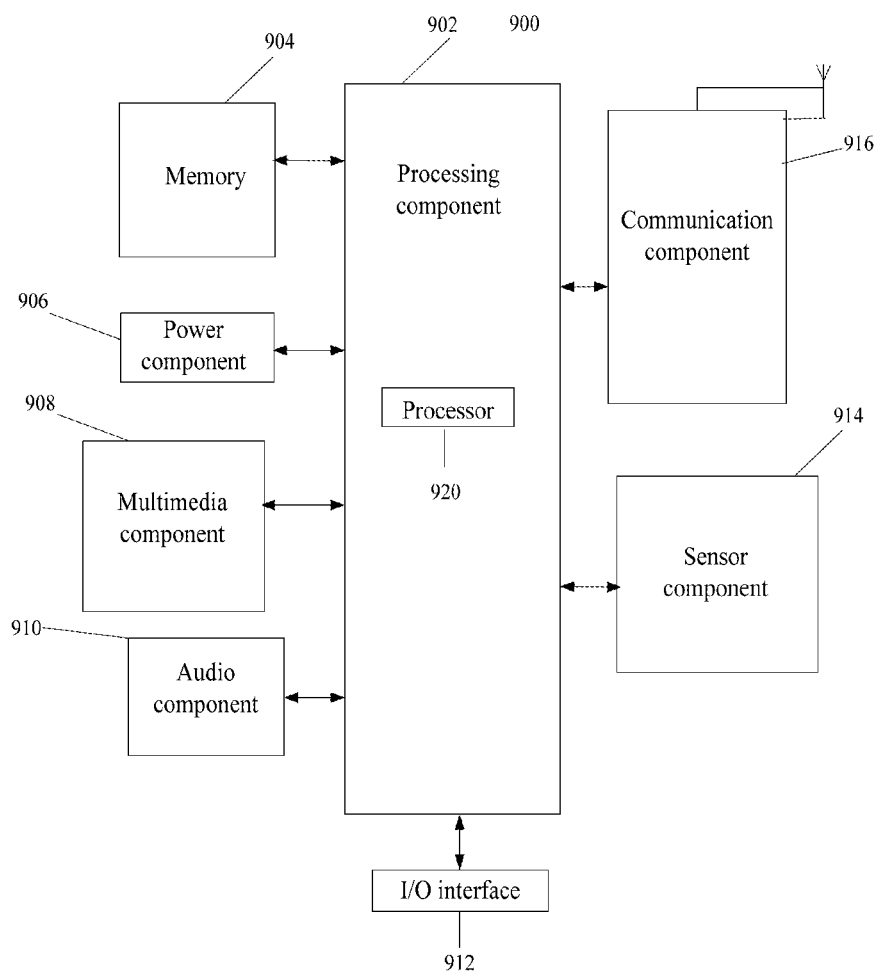
FIG. 9 is a schematic structural diagram of a terminal according to an embodiment of the present disclosure.

FIG. 9 is a block diagram of a terminal 900 according to an exemplary embodiment. For example, the terminal 900 may be a mobile phone, a computer, a digital broadcast terminal, a messaging device, a gaming console, a tablet, a medical device, an exercise equipment, a personal digital assistant and the like.

Referring to FIG. 9, the terminal 900 may include at least one of functional components provided by the abovementioned embodiments, and may further include one or more of the following components: a processing component 902, a memory 904, a power component 906, a multimedia component 908, an audio component 910, an Input/Output (I/O) interface 912, a sensor component 914, and a communication component 916.

The processing component 902 typically controls overall operations of the terminal 900, such as the operations associated with display, telephone calls, data communications, camera operations and recording operations. The processing component 902 may include one or more processors 920 to execute instructions to perform all or part of the steps in the abovementioned method. Moreover, the processing component 902 may include one or more modules which facilitate interaction between the processing component 902 and the other components. For instance, the processing component 902 may include a multimedia module to facilitate interaction between the multimedia component 908 and the processing component 902.

The memory 904 is configured to store various types of data to support the operation of the terminal 900. Examples of such data include instructions for any application programs or methods operated on the terminal 900, contact data, phonebook data, messages, pictures, videos, etc. The memory 904 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 906 provides power for various components of the terminal 900. The power component 906 may include a power management system, one or more power supplies, and other components associated with generation, management and distribution of power for the terminal 900.

The multimedia component 908 includes a screen providing an output interface between the terminal 900 and a user. In some embodiments, the screen may include a Liquid Crystal Display (LCD) and a Touch Panel (TP). When the screen includes the TP, the screen may be implemented as a touch screen to receive an input signal from the user. The TP includes one or more touch sensors to sense touches, swipes and gestures on the TP. The touch sensors may sense a boundary of a touch or swipe action. The touch sensors may also detect a duration and pressure associated with the touch or swipe action. In some embodiments, the multimedia component 908 includes a front camera and/or a rear camera. The front camera and/or the rear camera may receive external multimedia data when the terminal 900 is in an operation mode, such as a photographing mode or a video mode. Each of the front camera and the rear camera may be a fixed optical lens system or have focusing and optical zooming capabilities.

The audio component 910 is configured to output and/or input an audio signal. For example, the audio component 910 includes a MIC, and the MIC is configured to receive an external audio signal when the terminal 900 is in the operation mode, such as a call mode, a recording mode and a voice recognition mode. The received audio signal may further be stored in the memory 904 or sent through the communication component 916. In some embodiments, the audio component 910 further includes a speaker configured to output the audio signal.

The I/O interface 912 provides an interface between the processing component 902 and a peripheral interface module, and the peripheral interface module may be a keyboard, a click wheel, a button and the like. The button may include, but not limited to: a home button, a volume button, a starting button and a locking button.

The sensor component 914 includes one or more sensors configured to provide status assessment in various aspects for the terminal 900. For instance, the sensor component 914 may detect an on/off status of the terminal 900 and relative positioning of components such as a display and keypad of the terminal 900, and the sensor component 914 may further detect a change in a position of the terminal 900 or a component of the terminal 900, presence or absence of contact between the user and the terminal 900, orientation or acceleration/deceleration of the terminal 900 and a change in temperature of the terminal 900. The sensor component 914 may include a proximity sensor configured to detect presence of an object nearby without any physical contact. The sensor component 914 may also include a light sensor, such as a Complementary Metal Oxide Semiconductor (CMOS) or Charge Coupled Device (CCD) image sensor, configured to use in an imaging application. In some embodiments, the sensor component 914 may also include an acceleration sensor, a gyroscope sensor, a magnetic sensor, a pressure sensor or a temperature sensor.

The communication component 916 is configured to facilitate wired or wireless communication between the terminal 900 and other equipment. The terminal 900 may access a communication-standard-based wireless network, such as a Wireless Fidelity (WiFi) network, a 2nd-Generation (2G) or 3rd-Generation (3G) network or a combination thereof. In an exemplary embodiment, the communication component 916 receives a broadcast signal or broadcast associated information from an external broadcast management system through a broadcast channel. In an exemplary embodiment, the communication component 916 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a Bluetooth (BT) technology and other technologies.

In an exemplary embodiment, the terminal 900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 904 including instructions, and the instructions may be executed by the processor 920 of the terminal 900 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

According to a storage medium, instructions in the storage medium are executed by the processor of the terminal 900 to enable the processor to execute a method for controlling functional component, the method including:

providing a current in a first current direction for an electromagnet to move a moving part along one direction of a specified trajectory through a magnetic force between the electromagnet and a magnet, and providing a current in a direction opposite to the first current direction for the electromagnet to move the moving part along the other direction of the specified trajectory through the magnetic force between the electromagnet and the magnet.

Term "and/or" in the present disclosure describes an association relationship of associated objects and represents that three relationships may exist. For example, A and/or B may represent three conditions, i.e., independent existence of A, coexistence of A and B and independent existence of B. In addition, character "/" in the present disclosure usually represents that front and back associated objects form an "or" relationship.

Term "at least one of A and B" of the present disclosure describes an association relationship of associated objects and represents that three relationships may exist. For example, at least one of A and B may represent three conditions, i.e., independent existence of A, coexistence of A and B and independent existence of B. Similarly, "at least one of A, B and C" represents that seven relationships may exist and may represent seven conditions, i.e., independent existence of A, independent existence of B, independent existence of C, coexistence of A and B, coexistence of A and C, coexistence of C and B and coexistence of A, B and C. Similarly, "at least one of A, B, C and D" represents that fifteen relationships may exist and may represent fifteen conditions, i.e., independent existence of A, independent existence of B, independent existence of C, independent existence of D, coexistence of A and B, coexistence of A and C, coexistence of A and D, coexistence of C and B, coexistence of D and B, coexistence of C and D, coexistence of A, B and C, coexistence of A, B and D, coexistence of A, C and D, coexistence of B, C and D and coexistence of A, B, C and D.

In the present disclosure, terms "first", "second" and "third" are for a purpose of description and are not understood to indicate or imply relative importance. Term "multiple" refers to two or more than two, unless otherwise clearly defined.

Those ordinary skilled in the art know that implementation of all or part of the steps of the abovementioned embodiments may be completed through hardware and may also be completed through related hardware instructed by a program. The program may be stored in a computer-readable storage medium. The storage medium may be a ROM, a magnetic disk, an optical disc or the like.

Other embodiments of the disclosure may be relevant to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. The scope of the disclosure may be limited by the appended claims.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

What is claimed is:

1. An apparatus, comprising:
a magnetic moving structure having a fixed part, a moving part configured to be movable along a specified trajectory of the fixed part, and a magnetic part; and
a functional module that is connected with the moving part and is configured to move with the moving part,
wherein the magnetic part comprises a first magnet located on the fixed part and a second magnet located on the moving part and the magnetic part is configured to generate a magnetic force to move the moving part along the specified trajectory,
the first magnet is located on the fixed part at an accommodation point of the specified trajectory, and the magnetic part comprises a third magnet that is located at an ejection point of the specified trajectory of the fixed part, and
the fixed part comprises a sliding guide rail corresponding to the specified trajectory, and the moving part is movable along the sliding guide rail.

2. The apparatus of claim 1, wherein one of the first magnet and the second magnet is a permanent magnet and the other of the first magnet and the second magnet is an electromagnet.

3. The apparatus of claim 1, wherein the sliding guide rail comprises a pair of parallel sub-guide-rails, and the third magnet comprises a pair of sub-magnets that are respectively located on the pair of parallel sub-guide-rails.

4. The apparatus of claim 1, wherein a first connecting line of two magnetic poles of the first magnet is parallel to a second connection line of two magnetic poles of the second magnet.

5. The apparatus of claim 4, wherein a third connection line of two magnetic poles of the third magnet is parallel to the second connection line.

6. The apparatus of claim 1, wherein the functional module comprises a sound acquisition module, and the moving part comprises a magnetism isolation piece configured to provide a magnetic isolation to the sound acquisition module from the magnetic part.

7. The apparatus of claim 1, wherein the functional module comprises at least one of a fingerprint recognition module, a structured light face recognition module, a distance sensor, and a luminance sensor.

8. A terminal device, comprising:
a magnetic moving structure including a fixed part, a moving part configured to be movable along a specified trajectory of the fixed part, and a magnetic part having a first magnet located on the fixed part and a second magnet located on the moving part;
a functional module that is connected with the moving part and is configured to move with the moving part; and
a control circuitry configured to provide current to the magnetic part to generate a magnetic force to cause the moving part to move the functional module along the specified trajectory,
wherein the first magnet is located on the fixed part at an accommodation point of the specified trajectory, and the magnetic part comprises a third magnet that is located at an ejection point of the specified trajectory of the fixed part, and
the fixed part comprises a sliding guide rail corresponding to the specified trajectory, and the moving part is movable along the sliding guide rail.

9. The terminal device of claim 8, wherein one of the first magnet and the second magnet is a permanent magnet and the other of the first magnet and the second magnet is an electromagnet.

10. The terminal device of claim 8, wherein the sliding guide rail comprises a pair of parallel sub-guide-rails, and the third magnet comprises a pair of sub-magnets that are respectively located on the pair of parallel sub-guide-rails.

11. The terminal device of claim 8, wherein a first connecting line of two magnetic poles of the first magnet is parallel to a second connection line of two magnetic poles of the second magnet.

12. The terminal device of claim 11, wherein a third connection line of two magnetic poles of the third magnet is parallel to the second connection line.

13. The terminal device of claim 8, wherein the functional module comprises a sound acquisition module, and the moving part comprises a magnetism isolation piece configured to provide a magnetic isolation to the sound acquisition module from the magnetic part.

14. The terminal device of claim 8, wherein the functional module comprises at least one of a fingerprint recognition module, a structured light face recognition module, a distance sensor, and a luminance sensor.

* * * * *